July 28, 1925.

Re. 16,127

D. T. DAY

PROCESS FOR THE COMBINED SOLVENT AND DESTRUCTIVE DISTILLATION TREATMENT OF OIL CONTAINING EARTHY MATERIAL

Original Filed Dec. 7, 1920 2 Sheets-Sheet 1

Inventor

David T. Day.

By, Prentiss, Stone & Boyden

Attorneys

July 28, 1925. Re. 16,127

D. T. DAY

PROCESS FOR THE COMBINED SOLVENT AND DESTRUCTIVE DISTILLATION TREATMENT OF OIL CONTAINING EARTHY MATERIAL

Original Filed Dec. 7, 1920 2 Sheets-Sheet 2

Inventor,

David T. Day.

By Prentiss, Stone & Boyden

Attorneys.

Reissued July 28, 1925.

Re. 16,127

UNITED STATES PATENT OFFICE.

DAVID T. DAY, OF WASHINGTON, DISTRICT OF COLUMBIA; ELIZABETH E. DAY EXECUTRIX OF THE WILL OF SAID DAVID T. DAY, DECEASED.

PROCESS FOR THE COMBINED SOLVENT AND DESTRUCTIVE DISTILLATION TREATMENT OF OIL CONTAINING EARTHY MATERIAL.

Original application filed December 7, 1920, Serial No. 428,913. Divided and this application filed August 30, 1922, Serial No. 585,174. Patent No. 1,447,297, dated March 6, 1923. Application for reissue filed April 15, 1925. Serial No. 23,423.

*To all whom it may concern:*

Be it known that I, DAVID T. DAY, a citizen of the United States, residing at Washington, in the District of Columbia, have invented certain new and useful Improvements in Processes for the Combined Solvent and Destructive Distillation Treatment of Oil Containing Earthy Material, of which the following is a specification.

This invention relates to a process for effecting the extraction of oil from oil bearing shale, and earthy material, such as sand, and provides for extraction with a liquid bath of solvent combined with destructive distillation.

The invention provides specifically the process in which a bath or pool of liquid solvent is used and into which fresh shale is passed, the partial extraction of the oil from the earthy material by the solvent, the removal of the earthy material from the bath of oil, and the subsequent distillation of the earthy material so removed to effect cracking of the oil therein and the production of oil for the maintenance of the oil bath.

The process has made it possible to obtain a larger total yield of oil than is ordinarily possible by either the usual solvent extraction or by destructive distillation. Solvent extraction may remove three times as much oil from shale as is possible by destructive distillation. The present invention combines the solvent features with distillation in a way that uses the products formed during distillation to serve as material for the solvent bath.

The advantageous results made possible by the invention are due also in part to the heat exchange wherein the heat of condensation of the vapors within the solvent extraction chamber heats the earthy material as it moves through the chamber and thus enables the earthy material to go into the retort at a temperature equal to the boiling point of the solvent. Another feature provided by the use of very hot oil on the earthy material is the advantage derived by the increased ease and rapidity with which the oil soaked earthy material is treated in a retort to destructive distillation. In the treatment of shale, the process has been found to operate much more readily than was the case where relatively dry oil bearing shale was subjected to distillation and this is probably due to the fact that dry shale is an extremely poor conductor of heat and consequently distillation of shale must be not only slow but wasteful because of the time and fuel used for completing the distillation. Contrasted to the treatment of dry shale, the present process, by treating oil soaked shale, and particularly shale soaked with hot oil, shortens the required period of heating because of the inital rise in temperature due to the presence of hot oil extending into the center of each particle of shale and the fact that oil soaked shale is a better conductor of heat than the same shale in a drier condition.

Apparatus in which the process may be conducted should include a retort for the distillation of the shale which has been previously oil soaked, a treatment chamber for subjecting untreated shale to a bath of hot liquid oil, and communicating pipes providing for the passage of the products of distillation from the retort to a point where these products may be conveniently condensed to a sufficient degree to provide the materials used as the liquid bath in the treatment chamber. Details providing for the efficient and continuous operation of the process may also include the use of a screw, chain type, or any other suitable type of conveyor retort positioned substantially horizontally in a furnace, an inclined tubular treatment chamber above the retort tube and outside the furnace, and the relative position of the openings for the introduction and removal of shale or other solid or earthy material, the relative position of the pipes for the removal of liquid oil and aeriform material from the treatment chamber, the relative length of the pipes connected to the treatment chamber, and the mounting of a conveyor within the treatment chamber for the removal of shale. Claims directed to the distinctive apparatus features are presented in my Patent No. 1,447,298 issued March 6, 1923.

The above and additional details and advantages of the process are described and claimed in the following specification and claims. Apparatus for conducting the process is illustrated in the accompanying drawings, in which:—

Like numerals refer to like parts in the different figures of the drawing.

Figure 1:
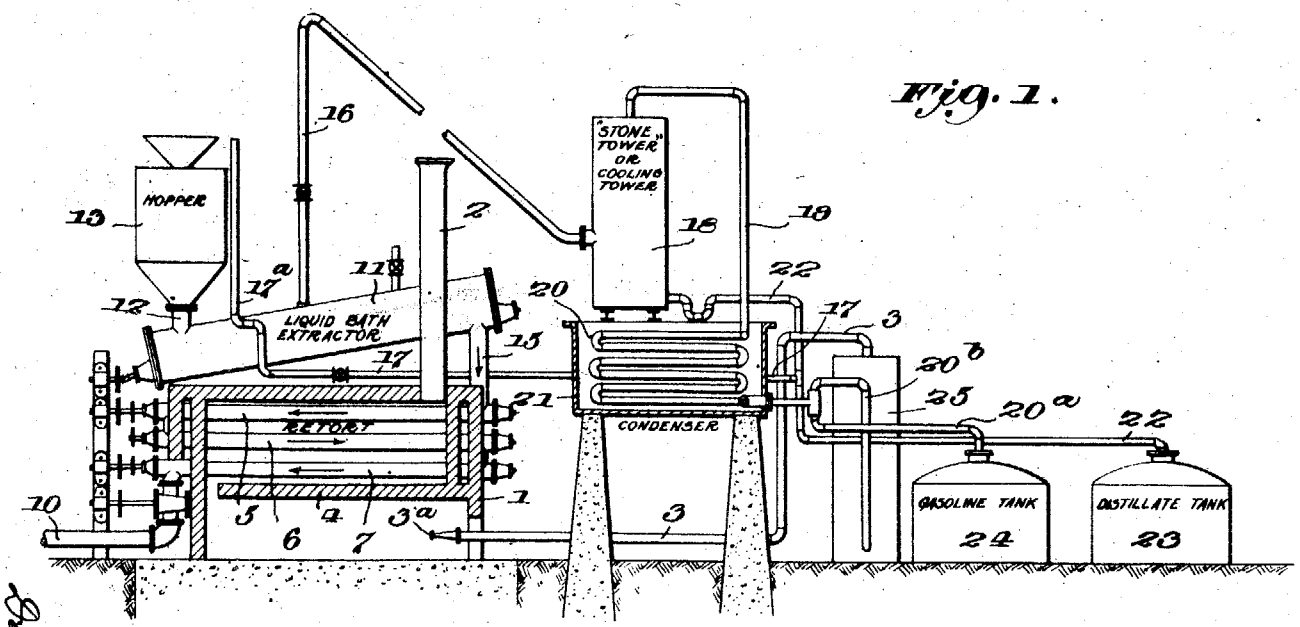
Figure 1 is a side elevation, partly broken away, of apparatus including a retort and treatment chamber which may be used for the process.

Referring in detail to the drawings of the apparatus which has been successfully used in conducting the process of the invention, 1 represents the masonry constructed of the furnace, either concrete, stone or brick, but preferably firebrick, such as will stand severe temperatures. A suitable stack 2 is provided for leading off the furnace fumes, smoke, and gases of combustion. A source of heat is provided by burners $3^a$ located at the lower part of the furnace and fed by suitable pipes 3 providing liquid or gaseous fuel obtained during the operation of the process and apparatus, as will be hereinafter further explained. The furnace may be braced by suitable buck stays, not shown, which enclose the outer walls of the furnace and hold the same to a suitable masonry or concrete base. The flames and hot gases from the burner nozzles is projected inwardly and passed upwardly in the furnace over a horizontally extending partition 4 and upward to ultimately escape through the stack 2. During the upward movement the heat comes into direct contact with the exterior of a plurality of longitudinally positioned retort tubes, as will be described.

The drawing illustrates three cracking tubes or retort tubes 5, 6 and 7, positioned one above the other and substantially horizontally. Within the tubes 5, 6 and 7 are respective screw conveyors $5^a$, $6^a$ and $7^a$, mounted on and adapted to turn with shafts $5^b$, $6^b$ and $7^b$, respectively. Suitable journal boxes or stuffing boxes are indicated for the respective shafts at $5^c$, $6^c$ and $7^c$. Materials within the tube 5 are passed to the left, referring to Figure 2, and are dropped through the communicating pipe 8 into the end of the tube 6, and similarly these materials are passed in the opposite direction in the tube 6 and are permitted to drop through the communicating pipe 9 to the lowermost tube 7, in which latter the materials are again moved to the left and are finally dropped into the discharge pipe 10 for spent shale. Discharge pipe 10 has a rotary valve $10^a$ adapted to periodically move to discharge shale in measured quantities, but not to permit the passage of air or gases into or out of the retort. The valve $10^a$ is mounted on a shaft $10^b$ and operated by the same power means as the shafts of the retort conveyors, as will be described. The direction of travel of the contents of the apparatus is indicated by arrows.

Immediately above the retort and furnace is mounted a treatment chamber 11 adapted to contain a pool or bath of liquid oil. This chamber is illustrated as an inclined tubular longitudinally extending member having its lower end adjacent the outlet end of the retort and its upper end positioned above the inlet end of the upper retort tube 5. A pipe 12 is indicated on the upper side of and leading from an opening in the chamber 11 adjacent the lower end thereof and communicates with a reservoir 13 above the same, which reservoir is provided with a suitable funnel shaped opening 14. At the opposite and upper end of the chamber 11 and on the underneath side thereof is a discharge opening having a pipe 15 leading therefrom and extending downwardly as a supply pipe for the receiving end of the retort tube 5. A screw conveyor $11^a$ is mounted within the chamber 11 and positioned substantially on the bottom thereof so as to move shale and solid material along the inclined floor of the chamber from the lower end thereof and dump such material into the pipe 15. The screw conveyor $11^a$ is mounted on shaft $11^b$ which in turn is provided with the necessary stuffing boxes or journal boxes $11^c$ at the ends of the chamber 11. The rate of treatment of the solid material is comparatively slow and is accomplished by the conveyor $11^a$ which should move in such a manner as to carry relatively small amounts comparatively slowly from the lower end of the chamber 11 to the discharge opening at the pipe 15. In addition to the rate of treatment, the invention also provides for the soaking of the oil by providing that the lower end of the chamber 11 constantly contain a bath or pool of liquid oil which normally covers the lower end of the pipe 12 and rises within that pipe and into the hopper 13 whenever the pressure may so require this movement. Likewise it is necessary that the upper end of the pipe 15, namely the discharge end of the chamber, be above the fluid level within the chamber so that the screw conveyor $11^a$ may move shale material out of the liquid oil bath before dumping the shale material into the pipe 15. On the upper side of the chamber is a discharge opening having a pipe 16 for the removal of gases and vapors from a region above the pool of oil. Another discharge opening having a pipe 17 is provided at a lower point on the chamber 11 for the removal of liquid oil provided and formed during the operation of the process and apparatus. This pipe 17 is attached to the chamber 11 at a point well removed from the lower side of the chamber so that no solid material or shale will be drawn off with the oil, and in the preferred arrangement this pipe is in close proximity to the pipe 12 near the upper surface but toward the lower end of the chamber 11. An upwardly extending pipe 17[a] having its upper end open to the air is connected to the pipe 17 to permit equalization of pressure and to prevent siphoning of oil through the pipe 17 when flow is started through this pipe. The pipe 17[a] should extend approximately as high as the upper end of the reservoir 13 so that the oil also may rise within this pipe subject to pressures within the chamber 11, as will be described.

The pipe 16 for the removal of aeriform materials preferably extends upward as an elongated run-back pipe, and is connected with a stone tower 18, and from this tower gases and lighter vapors are removed through the pipe 19 and passed through the coils of a condenser 20 positioned in the condenser tank 21. Liquid oil formed within the stone tower is drawn off through the pipe 22 and emptied into a distillate tank 23. Materials condensed in the coils 20 are removed through a pipe 20[a] and deposited in a gasoline tank 24. Gases remaining after passage through the condenser are led upward away from the pipe 20[a] and into a gas scrubber 25 by means of a pipe 20[b] connected to the lower end of the scrubber. The gases issuing from the scrubber at the top thereof are led through the pipe 3 to the burner nozzle 3[a] in the furnace. The pipe 17 for the removal of liquid oil from the oil bath in the chamber 11, extends the length of the apparatus, back of the condenser in Figure 1, and is connected to the pipe 22 which conducts liquid oil into the distillate tank 23.

Figure 3:
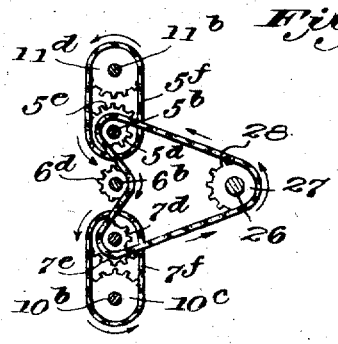
Figure 3 is a diagrammatic view illustrating the relative direction of rotation of the conveyor shafts, looking in the direction of the arrows on the line 3—3 of Figure 2.
Figure 2:
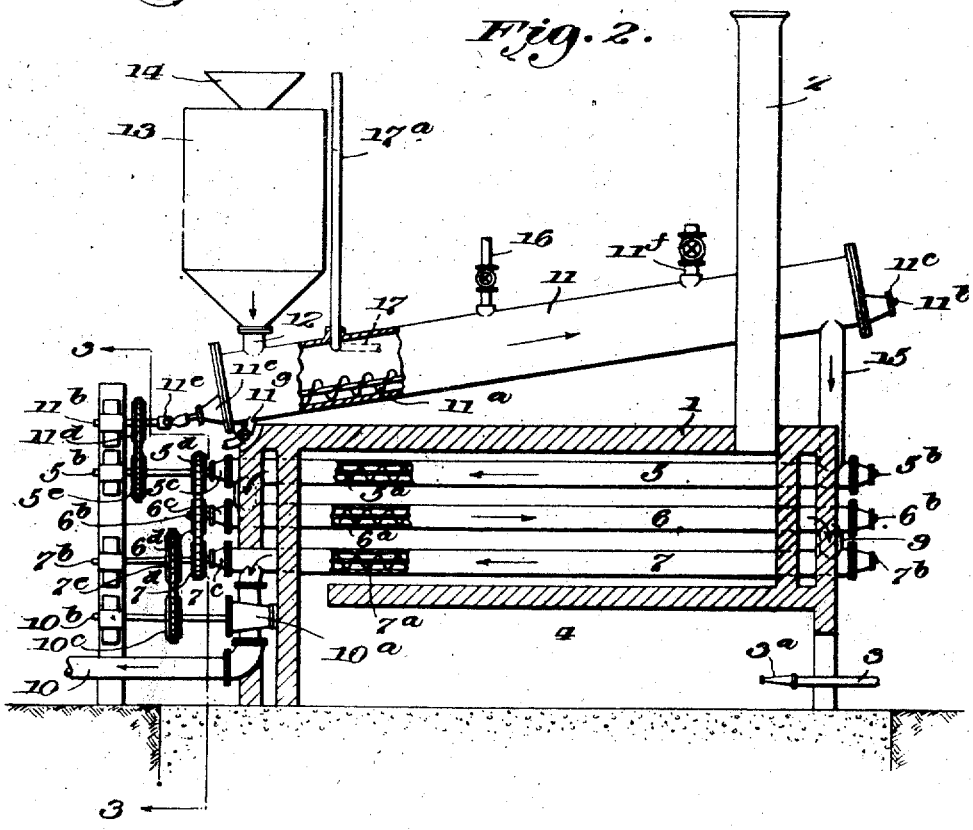
Figure 2 is an enlarged view, partly broken away and in partial section, illustrating the relation between the retort having the screw conveyors, and the inclined treatment chamber positioned above the retort.

Driving means for turning the shafts 5[b], 6[b], 7[b] and 11[b] is provided by the main drive shaft 26 mounted to suitable bearings, not shown, and driven from any suitable source of power. Referring to Figures 2 and 3, it will be noted that the shaft 26 moves counter clockwise and turns a sprocket gear 27, which in turn operates a continuous chain 28, which latter in turn extends over the sprocket gear 5[c], 6[c] and 7[c] which are mounted respectively on the conveyor shafts 5[b], 6[b] and 7[b]. The shaft 5[b] is provided with a second sprocket gear 5[e], which is adapted to drive a chain 5[f] passing over a sprocket gear 11[d] mounted on the conveyor shaft 11[b]. A universal joint in the shaft 11[b] is indicated at 11[e] to take care of the angle due to the inclination of the tank 11. At the lower side of the apparatus the conveyor shaft 7[b] is provided with a second sprocket wheel 7[e] which drives a chain 7[f] passing over a sprocket wheel 10[c] mounted on the valve shaft 10[b], thus constituting operating means for the valve 10[a]. The arrows in Figure 3 indicate the relative direction of rotation of the conveyor shafts and sprocket wheels.

At the upper end of the treatment chamber 11 is a pipe 11[f] for the introduction of materials used for washing out the treatment chamber, and at the lower end is a corresponding drawn pipe 11[g] for removing such materials.

The process has been satisfactorily conducted with apparatus in which the retort tubes 5, 6 and 7 were approximately of six inch bore, and in which a conveyor screw of five and three-quarter inches was operated. The invention preferably uses a tubular treatment chamber 11 which has a bore of from twenty-four to thirty inches in which the conveyor member is approximately eight inches. The operation of the process is not necessarily dependent on the relative size of the chamber and conveyor therein, but under certain conditions may be operated satisfactorily with a conveyor substantially filling the chamber, or by any kind of equipment capable of moving shale and solid material from the pool of oil, out of the same, and introducing it into the receiving end of the retort.

In the normal operation of the process, when first starting the same, liquid oil is poured into the opening 14 and sufficient is introduced to cover the lower end of the pipe 12, thus forming a liquid seal for this pipe. Such oil is preferably a distillate obtained from previous distillation, or what is known as tops or distillate, but any other liquid oil from petroleum is sufficiently effective as a seal to serve for the purpose. The use of water as a seal for the initial operation has been satisfactorily applied.

Crushed shale or other solid material containing the oil to be exfracted, in reduced form and containing chiefly lumps capable of passing through a two inch screen, is added by dumping the same in small amounts into the opening 14. The shale is introduced thus into the oil bath and is subjected thereby to a combined solvent treatment and oil soaking treatment. The conveyors are set in motion and the retort heated. It is the practice to introduce shale into the reservoir 13 as fast as it is removed by the screw conveyor 11[a], thus giving a mechanical advantage of preventing an accumulation of the shale, which because part of it is finely divided when stirred up with the oil, becomes a mud which is objectionable when passed into pipes. The column of shale moved along the floor of the chamber 11 is relatively small compared to the capacity of the chamber, usually not more than 10 per cent, of such shale being present as compared to the volume of the oil bath, and frequently the amount of shale is in much lower proportion. This continuous movement of the shale in small quantities is such that the shale is constantly in agitation and being stirred and is in constant contact with new portions of a relatively large bath of solvent oil. As the shale is moved from the chamber and through the retorts in the retort furnace it is subjected to increased temperatures during its progress through the apparatus. This heat treatment in the retorts drives off all oil material present in the shale and adhering thereto, and all that has not been removed by the slovent action of the bath of oil in the chamber 11. The gases and vapors generated within the retort tubes 5, 6 and 7 are passed upward through the pipe 15 and into the treatment chamber 11. In this region they come into contact with the relatively cooler walls of the chamber, and with the bath of oil with the fresh shale therein, and a substantial portion of the material is condensed and flows to the lower end of the chamber to supplement the volume of liquid oil. The nature and the amount of the materials so condensed depends on the temperature in the retort, in part, but chiefly on the relative size and coolness of the walls of the treatment chamber 11 and the length of the run-back pipe 16. The chamber 11 may be covered with insulating material to maintain heat conditions constant, or it may be artificially cooled. Likewise, the length of the pipe 16 may be varied and it also may be insulated or artificially cooled, such changes depending on the relative nature of the condensed materials to be used as the solvent bath.

The blast of flame from the burners 3ª provides a temperature in the lower retort hotter than the temperature in the upper retort. The temperature around the retort tubes should be from 900° F. to 1400° F. depending on the arrangement of flues and the disposition of the retort tubes within the furnace 1. The temperature within the retort tubes should be at least 550° F. and for the practical rapid operation about 700° F. is desired. However, the temperature within the tube does not have to be as high as ordinarily used for destructive distillation in small retorts, because in the present invention the heat is transmitted with comparative rapidity from the outside to the inside of each piece of shale, this being due, as hereinbefore explained, to the preliminary heating by the addition of the hot solvent oil which thoroughly soaks each piece of shale and likewise raises the temperature of the same. The product is improved because of the cracking which takes place within the lumps of shale, this particular cracking being improved by the presence of the shale itself. The temperature within the extraction chamber 11 is substantially the same as the temperature of the vapors issuing from the retort tubes through the pipe 15, as they are condensed to form the liquid of the extracting bath. These vapors thus condensed are approximately at a temperature of 300° F., and sometimes above, and sometimes below, depending on the position of the chamber 11 relative to the outside air, the distance from the furnace, and the constant cooling effected by such conditions.

The process is capable of operation at ordinary atmospheric pressure, under partial vacuum, and also under increased pressure. In the ordinary operation, the liquid oil in the lower end of the chamber 11, by covering the lower end of the pipe 12, merely provides a liquid seal and empties out through the pipe 17, flowing to the distillate tank 23, and no pressure different from atmospheric pressure is used. A gain in efficiency has been obtained when pressures up to 70 pounds at least have been applied, and under increased pressure extraction takes place more rapidly and completely on account of the higher temperature at which the solvent remains liquid instead of vaporizing. Pressures may be built up by partially closing the valves in the pipes 16 and 17, and the operation of an accumulation of pressure causes the liquid within the chamber 11 to back up through the pipe 12 and into the hopper or reservoir 13 until the hydrostatic pressure of this column of liquid is sufficient to balance the pressure within the apparatus. When the oil is thus backed up in the pipe 12 and the reservoir 13, it also rises in the air vent pipe 17ª, which latter should be high enough to permit this rise in liquid level.

The liquid oil taken off through the pipe 17 from the liquid extraction bath in the lower end of chamber 11 differs from the liquid obtained from the vapors which pass off through the pipe 16, because the former contains more or less of dissolved material extracted from the shale. The liquid in the chamber 11 also contains a more readily condensed vapor passed from the retort, and therefore has a higher specific gravity and higher boiling point than the vapors and the liquids condensed therefrom which are driven off through the pipe 16.

The process has been successfully conducted in the treatment of Monterey shale mined in California. Also, it has been successfully used in treating shales mined near Elko, Nevada, which latter contain large amounts of oil and wax which can be extracted by solvents. The invention has also been successfully used with shale taken from the Uintah Basin of Colorado and Utah, and also has successfully been used with oil soaked sand.

The process has produced remarkable results by using the steps of operation and the details hereinbefore specified. These features include the use of materials extracted by distillation as the material of a solvent bath for treating shale. Other arrangements capable of performing the steps specified for the process may be possible, but such arrangements are considered as within the scope of the process of this invention. For instance, the treatment chamber could extend downward from the right of the furnace so as to lower the chamber and in this case the upper end of the treatment chamber would have the same relative position as regards the connecting pipe 15, but the lower end of the chamber would be nearer the ground and consequently the reservoir 13 would be more readily reached. This arrangement might serve also to extend the lower end of the treatment chamber toward the source of shale supply thereby reducing the amount of conveyor apparatus necessary. The apparatus arrangement illustrated with the treatment chamber above the retort serves to economize floor space although the upper end of the reservoir 13 may not be as easily reached as if the treatment chamber was inclined downwardly toward the ground and positioned at one side of the furnace.

The term hydrocarbon oil material is understood to include all material removable from the shale by the process described and claimed. It is known that certain shale, such as the shale at Casmalia, California, contains considerable amounts of resin, which resin is removed from the shale by the process of this invention, along with the oil technically known as petroleum oil. The oil and resin may be separated by known refining steps. It is also known to me that the oil found near beds of shale, which beds contain such resin, also contains in solution, amounts of resin and allied oxidized bodies such as tar and wax, and that this material may be recovered and separated by treating the oil as it is obtained from the ground. The presence of such material in solution in oil in nature indicates the correctness of the theory of the present invention, which provides for the solvent extraction of the shale by the solvent obtained from the shale.

I claim:

1. The process of obtaining hydrocarbon oil material from oil bearing earthy material which process consists of subjecting the earthy material to be treated to immersion in a bath of liquid oil in a container, separating the earthy material from said bath of oil, subjecting all of said earthy material so separated to heat treatment to drive off substantially all volatilizable material therefrom, and passing the material thus driven off and in aeriform condition into the container of said bath of oil and utilizing the hydrocarbon material so driven off as the material of said bath of liquid oil.

2. The process of obtaining hydrocarbon oil material from oil bearing earthy material which process consists of subjecting the earthy material to be treated to immersion in a bath of liquid oil in a container, separating the earthy material from said bath of oil, subjecting all of said earthy material so separated to heat treatment to drive off substantially all volatilizable material therefrom, passing the material thus driven off and in aeriform condition into the container of said bath of oil and utilizing the hydrocarbon material so driven off as the material of said bath of liquid oil, and withdrawing liquid oil from said bath.

3. The process of obtaining hydrocarbon oil material from oil bearing earthy material which process consists of subjecting the earthy material to be treated to immersion in a bath of liquid oil in a container, separating the earthy material from said bath of oil, subjecting all of said earthy material so separated to heat treatment to drive off substantially all volatilizable material therefrom, passing the material thus driven off and in aeriform condition into the container of said bath of oil and utilizing the hydrocarbon material so driven off as the material of said bath of liquid oil, and withdrawing aeriform material from the region of said bath of oil.

4. The process of obtaining hydrocarbon oil material from oil bearing earthy material which process consists of subjecting the earthy material to be treated to immersion in a bath of liquid oil in a container, separating the earthy material from said bath of oil, subjecting all of said earthy material so separated to heat treatment to drive off substantially all volatilizable material therefrom, passing the material thus driven off and in aeriform condition into the container of said bath of oil and utilizing the hydrocarbon material so driven off as the material of said bath of liquid oil, withdrawing liquid oil from said bath, and withdrawing aeriform material from the region of said bath of oil and subjecting the aeriform material to a condensing treatment.

5. The process of continuously obtaining hydrocarbon oil from oil bearing earthy material which process consists of continuously subjecting the earthy material to be treated to immersion in a bath of liquid oil in a container, continuously separating all of said earthy material so separated to heat treatment to drive off substantially all volatilizable material therein and passing the material thus driven off and in volatilized condition into the container of said bath of oil and continuously utilizing the hydrocarbon material so driven off as the material of said bath of liquid oil.

6. The process of continuously obtaining hydrocarbon oil material from oil bearing earthy material which process consists of continuously subjecting earthy material to be treated to immersion in a bath of liquid oil in a container, continuously separating the earthy material from said bath of oil, continuously subjecting all of said earthy material so separated to heat treatment to drive off substantially all volatilizable material therefrom, passing the material thus driven off and in volatilized condition into the container of said bath of oil and continuously utilizing the hydrocarbon material so driven off as the material of said bath of liquid oil, and continuously withdrawing liquid oil from said bath.

7. The process of obtaining hydrocarbon oil material from oil bearing earthy material which process consists of continuously subjecting the earthy material to be treated to immersion in a bath of liquid oil in a container, continuously separating the earthy material from said bath of oil, continuously subjecting all of said earthy material so separated to heat treatment to drive off substantially all volatilizable material therefrom, passing the material thus driven off and in aeriform condition into the container of said bath of oil and continuously withdrawing aeriform material from the region of said bath of oil.

8. The process of obtaining hydrocarbon oil material from oil bearing earthy material which process consists of continuously subjecting the earthy material to be treated to immersion in a bath of liquid oil in a container, continuously separating the earthy material from said bath of oil, continuously subjecting all of said earthy material so separated to heat treatment to drive off substantially all volatilizable material therefrom, passing the material thus driven off and in volatilized condition into the container of said bath of oil and continuously utilizing the hydrocarbon material so driven off as the material of said bath of liquid oil, continuously withdrawing liquid oil from said bath, and continuously withdrawing aeriform material from the region of said bath of oil and subjecting the aeriform material to a condensing treatment.

9. The process of obtaining hydrocarbon oil material from oil bearing earthy material which process consists of subjecting a relatively small amount of the earthy material to be treated to immersion in a relatively large bath of liquid oil in a container, separating the earthy material from said bath of oil, subjecting all of said earthy material so separated to heat treatment to drive off substantially all volatilizable hydrocarbon material therefrom, and passing the material thus driven off into the container of said bath of oil and utilizing the hydrocarbon material so driven off as the material of said bath of liquid oil.

10. The process of obtaining hydrocarbon oil material from oil bearing earthy material which process consists of subjecting a relatively small amount of the earthy material to be treated to immersion in a relatively large bath of hot liquid oil in a container and permitting said hot liquid oil to permeate the earthy material, separating the earthy material from said bath of oil, subjecting all of said earthy material so separated to heat treatment to drive off substantially all volatilizable hydrocarbon material therefrom, and passing the material thus driven off into the container of said bath of oil and utilizing the hydrocarbon material so driven off as the material of said bath of liquid oil.

11. The process of obtaining hydrocarbon oil material from oil bearing earthy material which process consists of subjecting the earthy material to be treated to immersion in a pool of solvent liquid oil to effect the solvent removal from said earthy material of a portion of its oil content, removing the earthy material from said pool of oil, and thus separating the earthy material from the oil of the pool while leaving the oil thus separated in the pool ready for the treatment of successive amounts of oil bearing earthy material, subjecting the earthy material so separated to heat treatment to drive off substantially all volatilizable material therefrom, and utilizing the hydrocarbon material so driven off as the material of said pool of solvent liquid oil.

12. The process of obtaining hydrocarbon oil material from oil bearing earthy material which process consists of subjecting the earthy material to be treated to immersion in a pool of solvent liquid oil to effect the solvent removal from said earthy material of a portion of its oil content, removing the earthy material from said pool of oil, and thus separating the earthy material from the oil of the pool while leaving the oil thus separated in the pool ready for the treatment of successive amounts of oil bearing earthy material, subjecting the earthy material so separated to heat treatment sufficient to drive off substantially all volatilizable material therefrom and crack a portion of the same, and utilizing the hydrocarbon material so driven off as the material of said pool of solvent liquid oil.

13. The process of obtaining hydrocarbon oil material from oil bearing earthy material which process consists of subjecting the earthy material to be treated to immersion in a pool of solvent liquid oil to effect the solvent removal from said earthy material of a portion of its oil content, separating the earthy material from said pool of oil, and thus separating the earthy material from the oil of the pool while leaving the oil thus separated in the pool ready for the treatment of successive amounts of oil bearing earthy material, subjecting the earthy material so separated to heat treatment sufficient to drive off substantially all volatilizable material therefrom and crack a portion of the same, and utilizing the hydrocarbon material so driven off at a temperature of at least 300° F. as the material of said pool of solvent liquid oil.

In testimony that I claim the foregoing as my own, I have hereto affixed my signature.

DAVID T. DAY.